(12) United States Patent
Stratton et al.

(10) Patent No.: US 12,454,926 B1
(45) Date of Patent: Oct. 28, 2025

(54) EXHAUST NOZZLE ASSEMBLY FOR AN AIRCRAFT PROPULSION SYSTEM

(71) Applicant: Pratt & Whitney Canada Corp., Longueuil (CA)

(72) Inventors: Russell Stratton, Toronto (CA); Omer Abdul Wahab, Montreal (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/651,069

(22) Filed: Apr. 30, 2024

(51) Int. Cl.
| | |
|---|---|
| *F02K 1/00* | (2006.01) |
| *F02C 3/20* | (2006.01) |
| *F02C 9/18* | (2006.01) |
| *F02C 9/40* | (2006.01) |
| *F02C 9/52* | (2006.01) |
| *F02K 1/82* | (2006.01) |
| *F02C 3/06* | (2006.01) |

(52) U.S. Cl.
CPC ............. *F02K 1/00* (2013.01); *F02C 3/20* (2013.01); *F02C 9/18* (2013.01); *F02C 9/40* (2013.01); *F02C 9/52* (2013.01); *F02K 1/822* (2013.01); *F02C 3/06* (2013.01)

(58) Field of Classification Search
CPC ...... F02C 6/08; F02C 9/16; F02C 9/18; F02C 9/52; F02C 7/08; F02C 7/10; F02C 6/18; F02K 1/00; F02K 1/002; F02K 1/78; F02K 1/82; F02K 1/822; F02K 1/825; F05D 2260/61; F05D 2260/611; F01D 25/30
See application file for complete search history.

(56) References Cited

U.S. PATENT DOCUMENTS

| | | | |
|---|---|---|---|
| 2,516,910 | A | 8/1950 | Redding |
| 3,222,864 | A | 12/1965 | Dyste |
| 3,386,243 | A | 6/1968 | Beam, Jr. |
| 9,068,506 | B2 | 6/2015 | Eleftheriou |
| 12,065,964 | B1 * | 8/2024 | Terwilliger ............ F02C 7/141 |

* cited by examiner

*Primary Examiner* — William H Rodriguez
(74) *Attorney, Agent, or Firm* — Getz Balich LLC

(57) ABSTRACT

An aircraft propulsion system includes a gas turbine engine and an exhaust nozzle assembly. The gas turbine engine includes a compressor section, a combustor section, a turbine section, and an exhaust section. The compressor section, the combustor section, the turbine section, and the exhaust section form a core flow path through the gas turbine engine. The exhaust nozzle assembly is disposed at the exhaust section. The exhaust nozzle assembly includes a nozzle bypass system and an exhaust treatment system. The nozzle bypass system is selectively configurable in a bypass mode or an exhaust treatment mode. The nozzle bypass system in the bypass mode directs a core combustion gas from the core flow path through the exhaust nozzle assembly bypassing the exhaust treatment system. The nozzle bypass system in the exhaust treatment mode directs the core combustion gas through the exhaust nozzle assembly and exhaust treatment system.

17 Claims, 10 Drawing Sheets

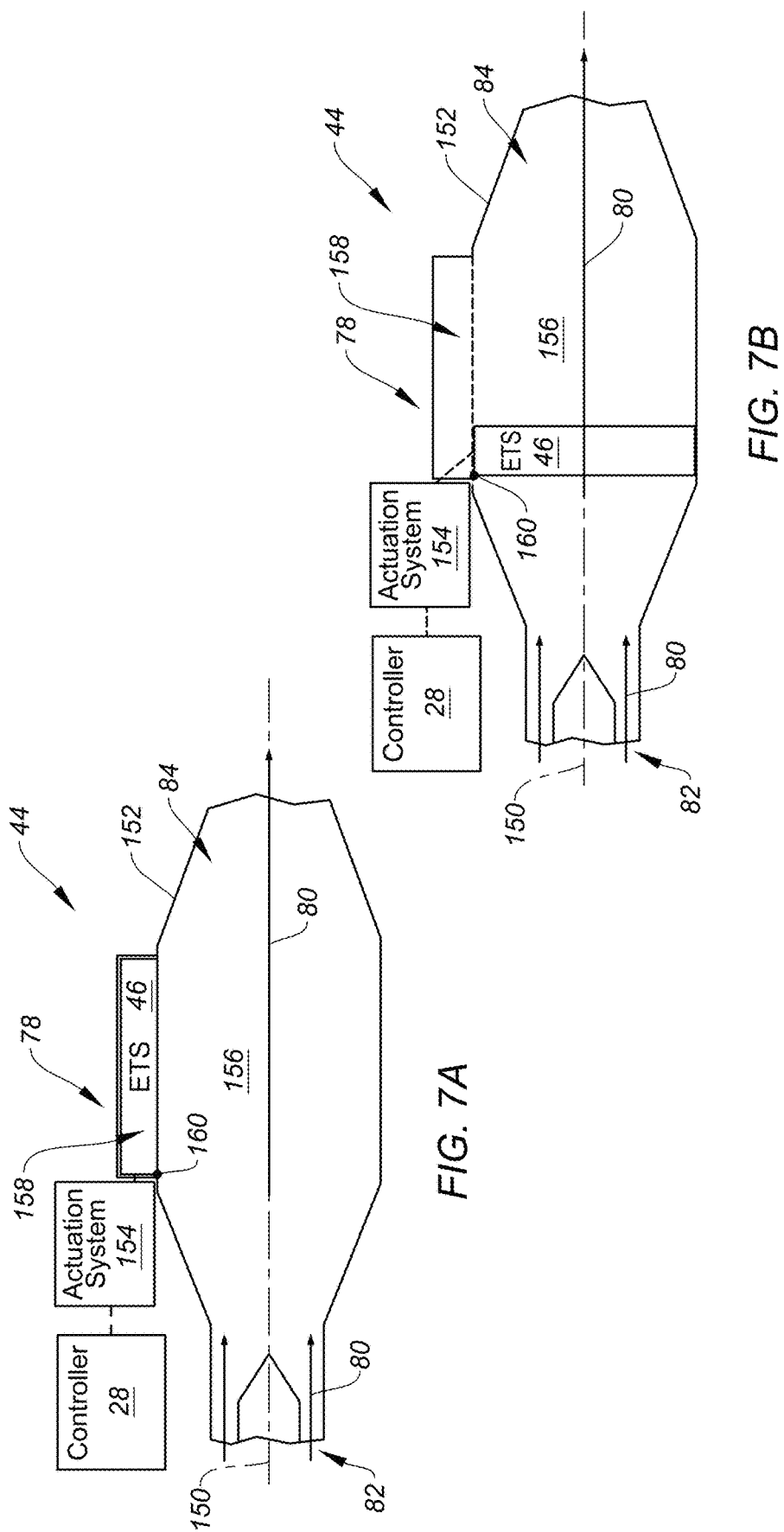

EXHAUST NOZZLE ASSEMBLY FOR AN AIRCRAFT PROPULSION SYSTEM

BACKGROUND

1. Technical Field

This disclosure relates generally to the aircraft propulsion systems and, more particularly, to propulsion system exhaust nozzle assemblies including an exhaust treatment system.

2. Background Information

Aircraft propulsion systems may include gas turbine engines configured for combustion of one or more fuels to facilitate operation of the gas turbine engine and thrust for an associated aircraft. The fuel may be any appropriate fuel such as a liquid or gas. Exemplary fuels include hydrocarbon-based fuels or hydrogen. Gas turbine engine combustion may yield undesirable exhaust compounds such as water vapor, nitrous oxide compounds (NOx), carbon containing compounds. Various systems and methods are known in the art for controlling aircraft propulsion system exhaust emissions. While these known systems and methods may be useful for their intended purposes, there is always room in the art for improvement.

SUMMARY

It should be understood that any or all of the features or embodiments described herein can be used or combined in any combination with each and every other feature or embodiment described herein unless expressly noted otherwise.

According to an aspect of the present disclosure, an aircraft propulsion system includes a gas turbine engine and an exhaust nozzle assembly. The gas turbine engine includes a compressor section, a combustor section, a turbine section, and an exhaust section. The compressor section, the combustor section, the turbine section, and the exhaust section form a core flow path through the gas turbine engine. The exhaust nozzle assembly is disposed at the exhaust section. The exhaust nozzle assembly includes a nozzle bypass system and an exhaust treatment system. The nozzle bypass system is selectively configurable in a bypass mode or an exhaust treatment mode. The nozzle bypass system in the bypass mode directs a core combustion gas from the core flow path through the exhaust nozzle assembly bypassing the exhaust treatment system. The nozzle bypass system in the exhaust treatment mode directs the core combustion gas through the exhaust nozzle assembly and exhaust treatment system.

In any of the aspects or embodiments described above and herein, the nozzle bypass system may further include at least one actuator positionable in a first actuator position or a second actuator position. The at least one actuator may be positioned in the first actuator position to configure the nozzle bypass system in the bypass mode. The at least one actuator may be positioned in the second actuator position to configure the nozzle bypass system in the exhaust treatment mode.

In any of the aspects or embodiments described above and herein, the aircraft propulsion system may further include a controller including a processor connected in signal communication with memory including instructions which, when executed by the processor, may cause the processor to control the nozzle bypass system in the bypass mode or the exhaust treatment mode by controlling the at least one actuator in the first actuator position or the second actuator position, respectively.

In any of the aspects or embodiments described above and herein, the instructions, when executed by the processor, may further cause the processor to: identify a flight condition of the aircraft propulsion system and control the nozzle bypass system in the bypass mode or the exhaust treatment mode in response to the identification of the flight condition by: controlling the nozzle bypass system in the bypass mode for one of a first subset of flight conditions and controlling the nozzle bypass system in the exhaust treatment mode for one of a second subset of flight conditions different than the first subset of flight conditions.

In any of the aspects or embodiments described above and herein, the instructions, when executed by the processor, may further cause the processor to: measure an operational parameter of the aircraft propulsion system, identify the operational parameter exceeds a threshold value, and control the nozzle bypass system from the exhaust treatment mode to the bypass mode in response to the identification of the operational parameter exceeding the threshold value.

In any of the aspects or embodiments described above and herein, the instructions, when executed by the processor, may further cause the processor to: identify a selected fuel for the combustion section from one of a first fuel and a second fuel and control the nozzle bypass system in the bypass mode or the exhaust treatment mode in response to the identification of the selected fuel by: controlling the nozzle bypass system in the bypass mode where the selected fuel is identified as the first fuel and controlling the nozzle bypass system in the exhaust treatment mode where the selected fuel is identified as the second fuel.

In any of the aspects or embodiments described above and herein, the first fuel may be a hydrocarbon fuel and the second fuel may be a hydrogen fuel.

In any of the aspects or embodiments described above and herein, the nozzle bypass system may include an inlet, a first outlet, and a second outlet. The nozzle bypass system in the bypass mode may direct the core combustion gas from the inlet through the second outlet bypassing the exhaust treatment system. The nozzle bypass system in the exhaust treatment mode may direct the core combustion gas from the inlet through the first outlet and the exhaust treatment system.

In any of the aspects or embodiments described above and herein, the nozzle bypass system may include an outer nozzle body, an inner nozzle body, an outer plurality of overlapping petals, and an inner plurality of overlapping petals. The outer nozzle body may form an outer nozzle duct extending between and to the inlet and the first outlet. The inner nozzle body may be disposed within the outer nozzle body. The inner nozzle body may form an inner nozzle duct extending between and to the inlet and the second outlet. The inner nozzle duct may extend through the outer nozzle body to the second outlet. The outer plurality of overlapping petals and the inner plurality of overlapping petals may be disposed at the inlet. Each of the outer plurality of overlapping petals and the inner plurality of overlapping petals may be pivotable between and to an inner radial position for the bypass mode and an outer radial position for the exhaust treatment mode. In the inner radial position the outer plurality of overlapping petals and the inner plurality of overlapping petals may direct the core combustion gas from the inlet through the second outlet. In the outer radial position the outer plurality of overlapping petals and the inner plurality of overlapping petals may direct the core combustion gas from the inlet through the first outlet and the exhaust treatment system.

In any of the aspects or embodiments described above and herein, the nozzle bypass system may include an outer nozzle body, an inner nozzle body, a bypass duct, an exhaust treatment duct, and a blocking member. The outer nozzle body and the inner nozzle body may extend circumferentially about an axis of the nozzle bypass system to form the inlet. The bypass duct and the exhaust treatment duct may form a bifurcated interface with the inlet. The bypass duct may be connected in fluid communication with the inlet at the bifurcated interface along a first arcuate portion of the inlet. The bypass duct may extend between and to the inlet and the second outlet. The exhaust treatment duct may be connected in fluid communication with the inlet at the bifurcated interface along a second arcuate portion of the inlet. The blocking member may be disposed within the inlet at the bifurcated interface. The blocking member may be circumferentially moveable within the inlet at the bifurcated interface between and to a bypass circumferential position for the bypass mode and an exhaust treatment circumferential position for the exhaust treatment mode. In the bypass circumferential position the blocking member may direct the core combustion gas from the inlet through the second outlet. In the exhaust treatment circumferential position the blocking member may direct the core combustion gas from the inlet through the first outlet and the exhaust treatment system.

In any of the aspects or embodiments described above and herein, the nozzle bypass system may include an outer nozzle body and a duct panel. The outer nozzle body may extend along an axis of the nozzle bypass system. The outer nozzle body may form a nozzle duct extending from the inlet to the first outlet along the axis. The outer nozzle body may include a first side and an opposing second side. The outer nozzle body may form the second outlet through the second side. The duct panel may be pivotably mounted to the second side downstream of the second outlet. The duct panel may be pivotable between and to a deployed position for the bypass mode and a retracted position for the exhaust treatment mode. In the deployed position the duct panel may be disposed at the first side and the duct panel may direct the core combustion gas through the second outlet. In the retracted position the duct panel may be disposed along the second side and the duct panel may direct the core combustion gas through the first outlet and the exhaust treatment system.

In any of the aspects or embodiments described above and herein, the nozzle bypass system may include an inlet and an outlet. The nozzle bypass system may further include an outer nozzle body. The outer nozzle body may form a nozzle duct and a treatment system cavity. The nozzle duct may extend along an axis of the nozzle bypass system between and to the inlet and the outlet. The treatment system cavity may be disposed outside of the nozzle duct. The exhaust treatment system may be pivotably mounted to the outer nozzle body at the treatment system cavity. The exhaust treatment system may be pivotable between and to a recessed position for the bypass mode and a deployed position for the exhaust treatment mode. In the recessed position the exhaust treatment system may be disposed within the treatment system cavity and the nozzle duct may direct the core combustion gas from the inlet through the outlet bypassing the exhaust treatment system. In the deployed position the exhaust treatment system may be disposed within the nozzle duct and the nozzle duct may direct the core combustion gas from the inlet through the outlet and the exhaust treatment system.

According to another aspect of the present disclosure, an aircraft propulsion system includes a gas turbine engine and an exhaust nozzle assembly. The gas turbine engine includes a compressor section, a combustor section, a turbine section, and an exhaust section. The compressor section, the combustor section, the turbine section, and the exhaust section form a core flow path through the gas turbine engine. The exhaust nozzle assembly is disposed at the exhaust section. The exhaust nozzle assembly includes a nozzle bypass system and an exhaust treatment system. The nozzle bypass system includes at least one actuator positionable in a first actuator position or a second actuator position to selectively configure the nozzle bypass system in a bypass mode or an exhaust treatment mode, respectively. The at least one actuator in the first actuator position controls the nozzle bypass system to direct a core combustion gas from the core flow path through the exhaust nozzle assembly bypassing the exhaust treatment system. The at least one actuator in the second actuator position controls the nozzle bypass system to direct the core combustion gas through the exhaust nozzle assembly and exhaust treatment system.

In any of the aspects or embodiments described above and herein, the aircraft propulsion system may further include a nacelle forming an exterior housing for the gas turbine engine. The nacelle and the exhaust section may form a bypass flow path through the aircraft propulsion system. The at least one actuator in the first actuator position may control the nozzle bypass system to direct the core combustion gas from the core flow path into the bypass flow path bypassing the exhaust treatment system.

In any of the aspects or embodiments described above and herein, the exhaust treatment system may include a monolithic catalyst structure.

In any of the aspects or embodiments described above and herein, the exhaust treatment system may include a heat exchanger.

In any of the aspects or embodiments described above and herein, the aircraft propulsion system may further include a controller including a processor connected in signal communication with memory including instructions which, when executed by the processor, may cause the processor to control the nozzle bypass system in the bypass mode or the exhaust treatment mode by controlling the at least one actuator in the first actuator position or the second actuator position, respectively.

In any of the aspects or embodiments described above and herein, the instructions, when executed by the processor, may further cause the processor to: identify a flight condition of the aircraft propulsion system and control the nozzle bypass system in the bypass mode or the exhaust treatment mode in response to the identification of the flight condition by: controlling the nozzle bypass system in the bypass mode for one of a first subset of flight conditions and controlling the nozzle bypass system in the exhaust treatment mode for one of a second subset of flight conditions different than the first subset of flight conditions.

In any of the aspects or embodiments described above and herein, the instructions, when executed by the processor, may further cause the processor to: measure an operational parameter of the aircraft propulsion system, identify the operational parameter exceeds a threshold value, and control the nozzle bypass system from the exhaust treatment mode to the bypass mode in response to the identification of the operational parameter exceeding the threshold value.

In any of the aspects or embodiments described above and herein, the instructions, when executed by the processor, may further cause the processor to: identify a selected fuel for the combustion section from one of a first fuel and a second fuel and control the nozzle bypass system in the bypass mode or the exhaust treatment mode in response to the identification of the selected fuel by: controlling the nozzle bypass system in the bypass mode where the selected fuel is identified as the first fuel and controlling the nozzle bypass system in the exhaust treatment mode where the selected fuel is identified as the second fuel.

The present disclosure, and all its aspects, embodiments and advantages associated therewith will become more readily apparent in view of the detailed description provided below, including the accompanying drawings.

BRIEF DESCRIPTION OF THE DRAWINGS

FIGS. 7A-B schematically illustrate cutaway, side views of another nozzle bypass system in a bypass mode and an exhaust treatment mode, in accordance with one or more embodiments of the present disclosure.

DETAILED DESCRIPTION

Figure 1:
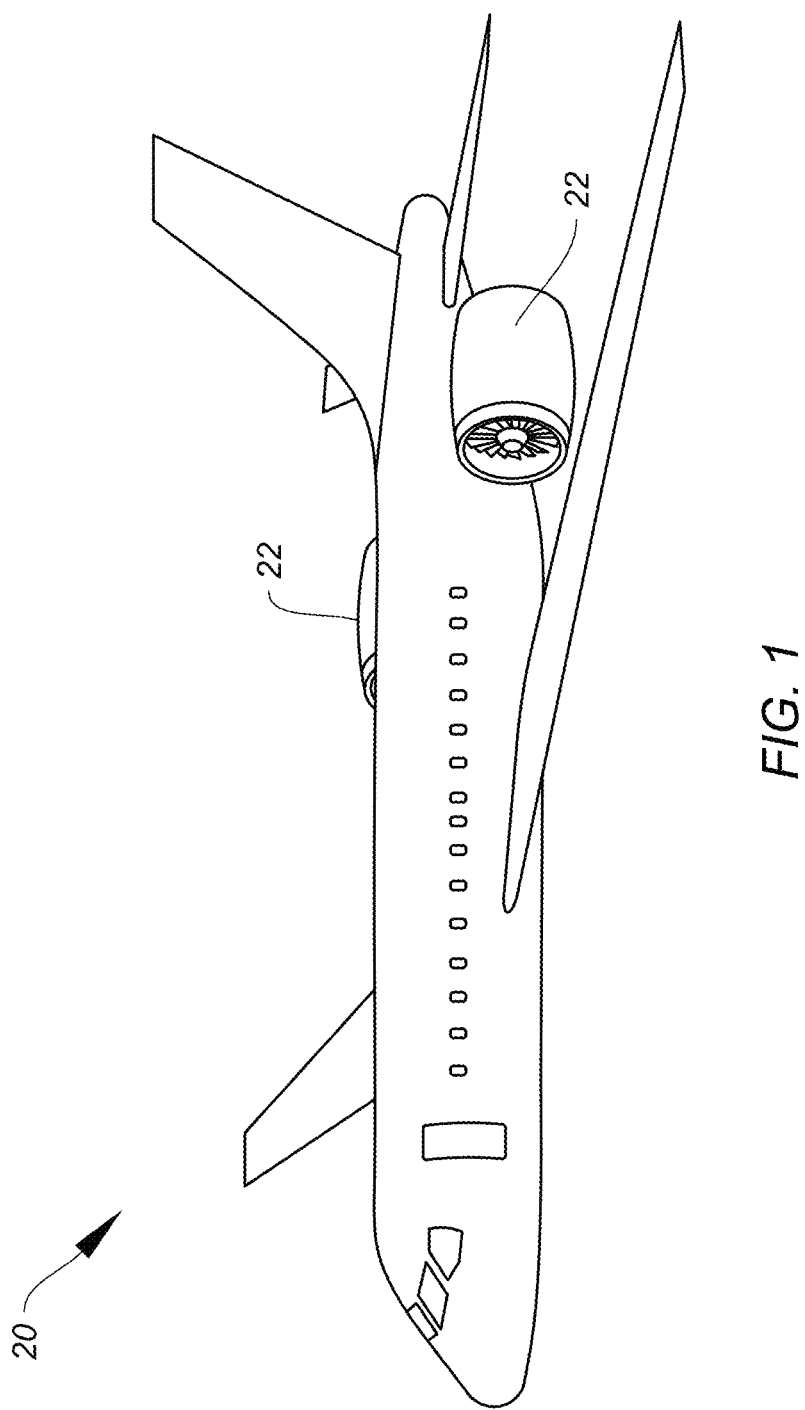
FIG. 1 illustrates a perspective view of an aircraft including a propulsion system, in accordance with one or more embodiments of the present disclosure.
Figure 2:
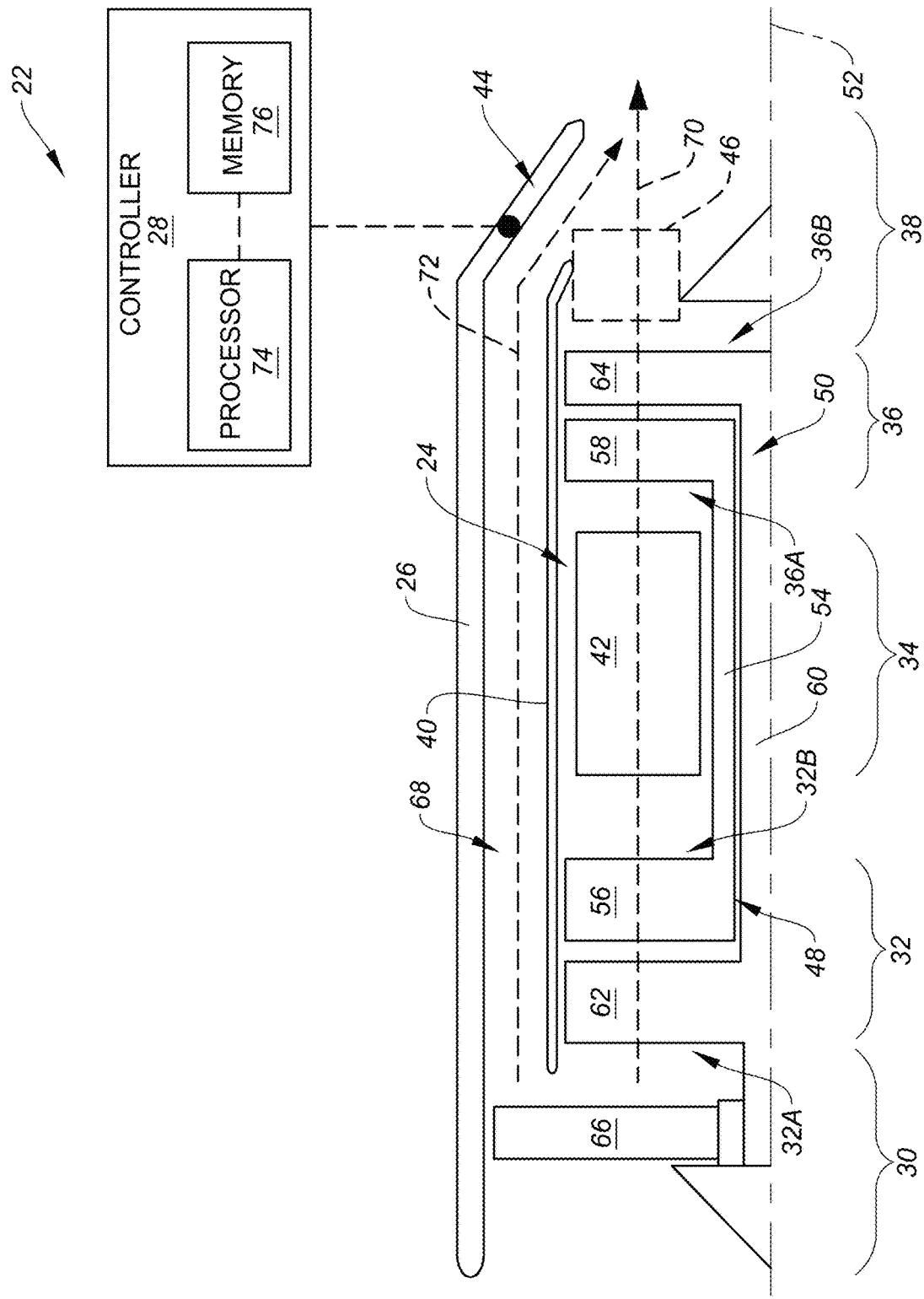
FIG. 2 schematically illustrates a cutaway, side view of an aircraft propulsion system including a gas turbine engine, in accordance with one or more embodiments of the present disclosure.

FIG. 1 illustrates an aircraft 20 including a propulsion system 22. Briefly, the aircraft 20 may be a fixed-wing aircraft (e.g., an airplane), a rotary-wing aircraft (e.g., a helicopter), a tilt-rotor aircraft, a tilt-wing aircraft, or another aerial vehicle. Moreover, the aircraft 20 may be a manned aerial vehicle or an unmanned aerial vehicle (UAV, e.g., a drone). FIG. 2 schematically illustrates a cutaway, side view of the propulsion system 22. The propulsion system 22 of FIG. 2 includes a gas turbine engine 24, a nacelle 26, and a controller 28.

The gas turbine engine 24 of FIG. 2 is configured as a multi-spool turbofan gas turbine engine 24. However, while the following description and accompanying drawings may refer to the turbofan gas turbine engine 24 of FIG. 2 as an example, it should be understood that aspects of the present disclosure may be equally applicable to other types of gas turbine engines including, but not limited to, a turboshaft gas turbine engine, a turboprop gas turbine engine, a turbojet gas turbine engine, a propfan gas turbine engine, or an open rotor gas turbine engine.

The gas turbine engine 24 of FIG. 2 includes a fan section 30, a compressor section 32, a combustor section 34, a turbine section 36, an exhaust section 38, and an engine static structure 40. The compressor section 32 of FIG. 2 includes a low-pressure compressor (LPC) 32A and a high-pressure compressor (HPC) 32B. The combustor section 34 includes a combustor 42 (e.g., an annular combustor). The turbine section 36 of FIG. 2 includes a high-pressure turbine (HPT) 36A and a low-pressure turbine (LPT) 36B. The exhaust section 38 includes an exhaust nozzle assembly 44. Portions of the exhaust section 38 and the exhaust nozzle assembly 44 may be formed by components of the gas turbine engine 24 and/or the nacelle 26. The exhaust nozzle assembly 44 includes an exhaust treatment system 46 (ETS).

Components of the fan section 30, the compressor section 32, and the turbine section 36 form a first rotational assembly 48 (e.g., a high-pressure spool) and a second rotational assembly 50 (e.g., a low-pressure spool) of the gas turbine engine 24. The first rotational assembly 48 and the second rotational assembly 50 are mounted for rotation about a rotational axis 52 (e.g., an axial centerline) of the gas turbine engine 24 relative to the engine static structure 40. The present disclosure, however, is not limited to the two-spool gas turbine engine configuration of FIG. 2. For example, aspects of the present disclosure may be equally applicable to single-spool and three-spool gas turbine engine configurations.

The first rotational assembly 48 includes a first shaft 54, a bladed first compressor rotor 56 for the high-pressure compressor 32B, and a bladed first turbine rotor 58 for the high-pressure turbine 36A. The first shaft 54 interconnects the bladed first compressor rotor 56 and the bladed first turbine rotor 58.

The second rotational assembly 50 includes a second shaft 60, a bladed second compressor rotor 62 for the low-pressure compressor 32A, a bladed second turbine rotor 64 for the low-pressure turbine 36B, and a bladed fan rotor 66 for the fan section 30. The second shaft 60 interconnects the bladed second compressor rotor 62 and the bladed second turbine rotor 64. The second shaft 60 may additionally interconnect the bladed fan rotor 66 with the bladed second compressor rotor 62 and the bladed second turbine rotor 64. Alternatively, the second shaft 60 may be coupled with the bladed fan rotor 66 by a gear assembly (e.g., a reduction gear box (RGB)). The first shaft 54 and the second shaft 60 are concentric and configured to rotate about the rotational axis 52. The present disclosure, however, is not limited to concentric configurations of the first shaft 54 and the second shaft 60.

The engine static structure 40 may include one or more engine cases, cowlings, bearing assemblies, inner fixed structures, and/or other non-rotating structures configured to house and/or support (e.g., rotationally support) components of the gas turbine engine sections 30, 32, 34, 36, 38. The engine static structure 40 may form an exterior (e.g., an outer radial portion) of the gas turbine engine 24.

The nacelle 26 is configured to house and provide an aerodynamic cover for the gas turbine engine 24. The nacelle may extend circumferentially about (e.g., completely around) the gas turbine engine 24 and its rotational axis 52. The nacelle may circumscribe and form an annular bypass duct 68 through the propulsion system 22. For example, the bypass duct 68 may be formed by and between (e.g., radially between) the gas turbine engine 24 (e.g., the engine static structure 40) and the nacelle 26.

In operation of the gas turbine engine 24, ambient air is directed through the fan section 30 and into a core flow path 70 (e.g., an annular flow path) and a bypass flow path 72 (e.g., an annular flow path) by rotation of the bladed fan rotor 66. Air flow along the core flow path 70 is compressed by the low-pressure compressor 32A and the high-pressure compressor 32B, mixed and burned with fuel in the combustor 42, and the resultant combustion gas is directed through the high-pressure turbine 36A and the low-pressure turbine 36B. The bladed first turbine rotor 58 and the bladed second turbine rotor 64 rotationally drive the first rotational assembly 48 and the second rotational assembly 50, respectively, in response to the combustion gas flow through the high-pressure turbine 36A and the low-pressure turbine 36B. The combustion gas exiting the turbine section 36 is exhausted from the propulsion system 22 through the exhaust section 38 by the exhaust nozzle assembly 44. The combustion gas may be selectively directed through the exhaust treatment system 46 by the exhaust nozzle assembly 44, as will be discussed in further detail. Air flow along the bypass flow path 72 is directed through the bypass duct 68 and is exhausted from the propulsion system 22 through the exhaust section 38 by the exhaust nozzle assembly 44.

The controller 28 includes a processor 74 connected in communication (e.g., signal communication with memory 76. The processor 74 may include any type of computing device, computational circuit, or any type of process or processing circuit capable of executing a series of instructions that are stored in the memory 76, thereby causing the processor 74 to perform or control one or more steps or other processes. The processor 74 may include multiple processors and/or multicore CPUs and may include any type of processor, such as a microprocessor, digital signal processor, co-processors, a micro-controller, a microcomputer, a central processing unit, a field programmable gate array, a programmable logic device, a state machine, logic circuitry, analog circuitry, digital circuitry, etc., and any combination thereof. Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. The instructions may include an operating system, and/or executable software modules such as program files, system data, buffers, drivers, utilities, and the like. The executable instructions may apply to any functionality described herein to enable the propulsion system 22 (e.g., the exhaust nozzle assembly 44) to accomplish the same algorithmically and/or by coordination of propulsion system 22 components. The memory 76 may include a single memory device or a plurality of memory devices (e.g., a computer-readable storage device that can be read, written, or otherwise accessed by a general purpose or special purpose computing device, including any processing electronics and/or processing circuitry capable of executing instructions). The present disclosure is not limited to any particular type of memory device, which may be non-transitory, and may include read-only memory, random access memory, volatile memory, non-volatile memory, static memory, dynamic memory, flash memory, cache memory, volatile or non-volatile semiconductor memory, optical disk storage, magnetic disk storage, magnetic tape, other magnetic storage devices, or any other medium capable of storing one or more instructions, and/or any device that stores digital information. The memory device(s) may be directly or indirectly coupled to the controller 28. The controller 28 may include, or may be in communication with, an input device that enables a user to enter data and/or instructions, and may include, or be in communication with, an output device configured, for example to display information (e.g., a visual display or a printer), or to transfer data, etc. Communications between the controller 28 and components of the propulsion system 22 may be via a hardwire connection or via a wireless connection. A person of skill in the art will recognize that portions of the controller 28 may assume various forms (e.g., digital signal processor, analog device, etc.) capable of performing the functions described herein.

The controller 28 may form or otherwise be part of an electronic engine controller (EEC) for the gas turbine engine 24. The EEC may control operating parameters of the gas turbine engine 24 including, but not limited to, fuel flow, stator vane position (e.g., variable compressor inlet guide vane (IGV) position), compressor air bleed valve position, shaft (e.g., first shaft 54 and/or second shaft 60) torque and/or rotation speed, etc. so as to control an engine power or performance of the gas turbine engine 24. The EEC may modulate fuel flow to the combustor 42 to obtain a desired output power of the gas turbine engine 24. In some embodiments, the EEC may be part of a full authority digital engine control (FADEC) system for the propulsion system 22.

Figure 3B:
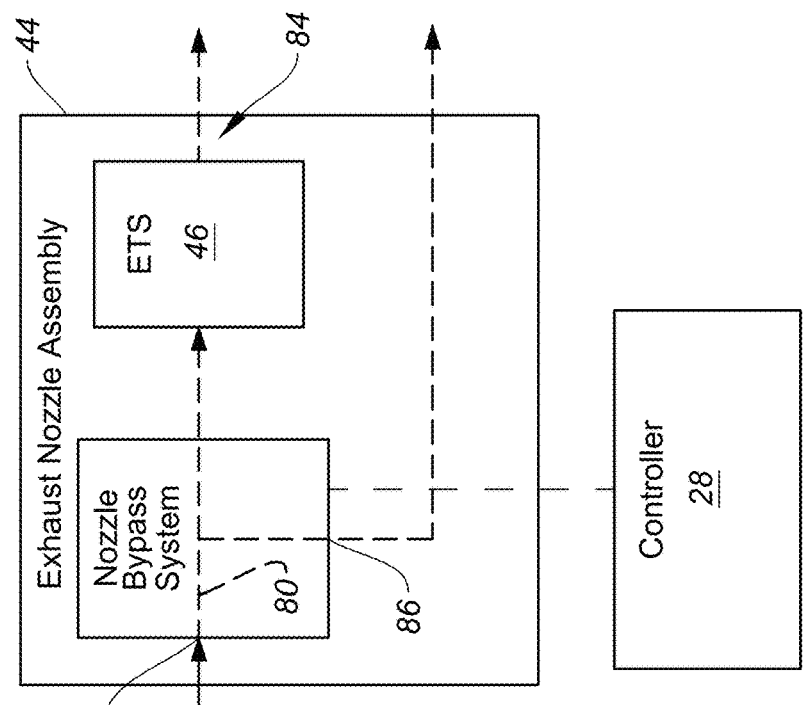
FIGS. 3A-B schematically illustrate an exhaust nozzle assembly including a nozzle bypass system and an exhaust treatment system, in accordance with one or more embodiments of the present disclosure.
Figure 3A:
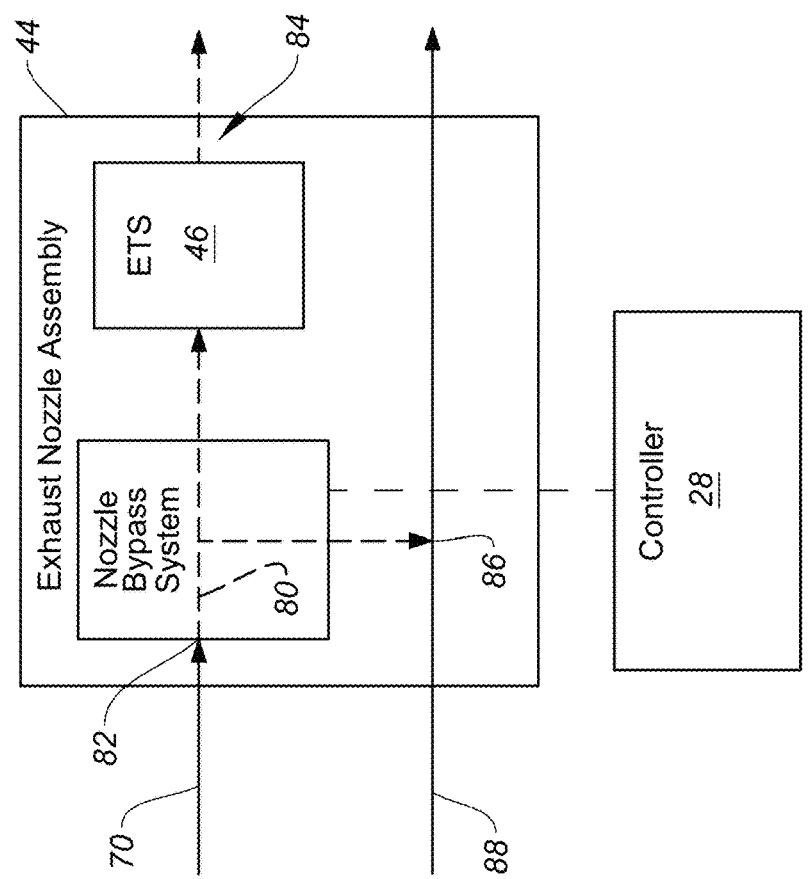

FIGS. 3A-B diagrammatically illustrate embodiments of the exhaust nozzle assembly 44. The exhaust nozzle assembly 44 of FIGS. 3A-B includes a nozzle bypass system 78 and the exhaust treatment system 46. The nozzle bypass system 78 is selectively configurable (e.g., positionable) in an exhaust treatment mode and a bypass mode. The nozzle bypass system 78, in the exhaust treatment mode, directs all or substantially all of the core combustion gas (schematically illustrated as core combustion gas 80) from the turbine section 36 (see FIG. 2) into and through the exhaust treatment system 46. The nozzle bypass system 78, in the bypass mode, directs all or substantially all of the core combustion gas 80 from the turbine section 36 out of the propulsion system 22 through the exhaust nozzle assembly 44 without passing through the exhaust treatment system 46. In other words, the nozzle bypass system 78, in the bypass mode, directs the core combustion gas 80 to bypass the exhaust treatment system 46. In some embodiments, the nozzle bypass system 78 may additionally be configurable in a modulation mode to direct a first portion of the core combustion gas 80 through the exhaust treatment system 46 and a second portion of the core combustion gas 80 to bypass the exhaust treatment system 46.

The nozzle bypass system 78 includes an inlet 82 and a first outlet 84. The nozzle bypass system 78 may additionally include a second outlet 86. The inlet 82 is connected in fluid communication with the turbine section 36 to receive the core combustion gas 80 from the turbine section 36. The first outlet 84 is connected in fluid communication with the exhaust treatment system 46. The nozzle bypass system 78, in the exhaust treatment mode, may be configured to direct all or substantially all of the core combustion gas 80 through the first outlet 84 to the exhaust treatment system 46. The nozzle bypass system 78, in the bypass mode, may be configured to direct all or substantially all of the core combustion gas 80 out of the propulsion system 22 through the second outlet 86, thereby bypassing the exhaust treatment system 46. As shown in FIG. 3A, the second outlet 86 may be connected in fluid communication with a secondary fluid flow path 88 through the exhaust nozzle assembly 44 such as, but not limited to, a bypass flow path (e.g., the bypass flow path 72; see FIG. 2), a freestream flow path, or the like. The nozzle bypass system 78 may, therefore, be configured in the bypass mode to direct the core combustion gas 80 into the second fluid flow path 88 to be exhausted from the propulsion system 22. As shown in FIG. 3B, the second outlet 86 may alternatively be configured to directly exhaust the core combustion gas 80 from the propulsion system 22 (e.g., the exhaust nozzle assembly 44).

The exhaust treatment system 46 may be configured to treat the core combustion gas 80 from the gas turbine engine 24 so as to eliminate or reduce a quantity of one or more compounds within the core combustion gas 80. Additionally or alternatively, the exhaust treatment system 46 may be configured to alter the physical properties (e.g., pressure, temperature, velocity, etc.) of the core combustion gas 80 flowing therethrough. In some embodiments, the exhaust treatment system 46 may include a heat exchanger or condenser configured to reduce an amount of water or other fluid vapors in the core combustion gas 80, for example, minimize or eliminate the formation of condensation trails (i.e., contrails) formed from operation of the gas turbine engine 24.

In some embodiments, the exhaust treatment system 46 (e.g., a heat exchanger) may additionally or alternatively be configured to thermally condition (e.g., heat) a fuel or other fluid for use by the gas turbine engine 24. For example, the exhaust treatment system 46 may be configured to heat a fuel (e.g., hydrogen) prior to injection into the combustor 42.

In some embodiments, the exhaust treatment system 46 may additionally or alternatively be configured to absorb or capture carbon containing compounds (e.g., carbon dioxide ($CO_2$)) from the core combustion gas 80. In some embodiments, the exhaust treatment system 46 may additionally or alternatively be configured to reduce the concentration of air pollutants such as, but not limited to, nitrogen oxides (NOx) from the combustion exhaust gases. For example, the exhaust treatment system 46 may include a monolithic catalyst structure configured for the treatment of NOx within the core combustion gas 80. The monolithic catalyst structure may be made from a ceramic material forming a plurality of substrate cells defining a respective plurality of channels through the monolithic catalyst structure. The monolithic catalyst structure may include a catalyst washcoat applied to the surfaces of the substrate cells. The catalyst washcoat serves as a carrier for a catalyst such as, but not limited to, platinum, palladium, rhodium, and/or zeolite, which catalyst is used to stimulate and accelerate a NOx reduction chemical reaction of the monolithic catalyst structure. The present disclosure, however, is not limited to any particular form or configuration of exhaust treatment system 46 for the exhaust nozzle assembly 44.

The use of the exhaust treatment system 46 with the exhaust nozzle assembly 44, as described above, may also result in propulsion system 22 performance penalties (e.g., increased pressure loss, reduced engine power output, etc.). For example, catalytic reduction of NOx may reduce an overall climate and pollution impact of operation of the propulsion system 22, but may also reduce a total power output (e.g., a maximum shaft horsepower) of the gas turbine engine 24, which may be undesirable during certain operating conditions of the propulsion system 22 (e.g., takeoff, engine failure, etc.). Another example is a multi-fuel gas turbine engine configured for selectively burning two or more fuels depending on factors such as fuel availability, mission requirements, or operating conditions. One multi-fuel gas turbine engine embodiment may employ burning either hydrogen or hydrocarbon jet fuel. Cryogenic liquid hydrogen can be heated to improve overall efficiency using heat exchangers (e.g., the exhaust treatment system 46) in the exhaust nozzle assembly 44; however, such heat exchanges may be unused and may reduce overall efficiency when the gas turbine engine is running on hydrocarbon fuels. The nozzle bypass system 78 of the present disclosure facilitates selective bypassing of the exhaust treatment system 46 during operation of the propulsion system 22 to facilitate improved efficiency and performance of the propulsion system 22 while also capturing the benefits of gas turbine engine exhaust treatment.

Figure 4A:
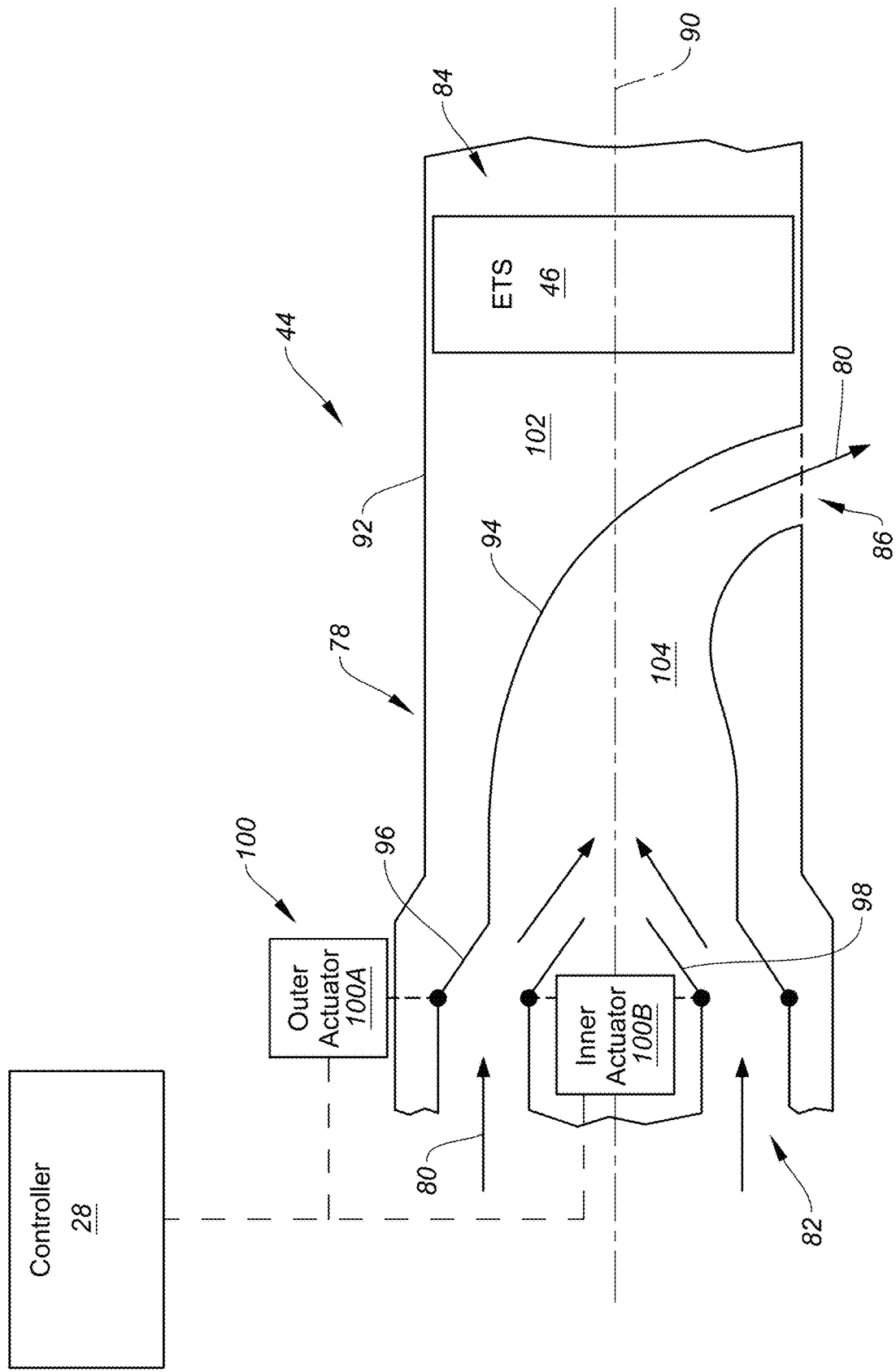
FIGS. 4A-B schematically illustrate cutaway, side views of a nozzle bypass system in a bypass mode and an exhaust treatment mode, in accordance with one or more embodiments of the present disclosure.
Figure 4B:
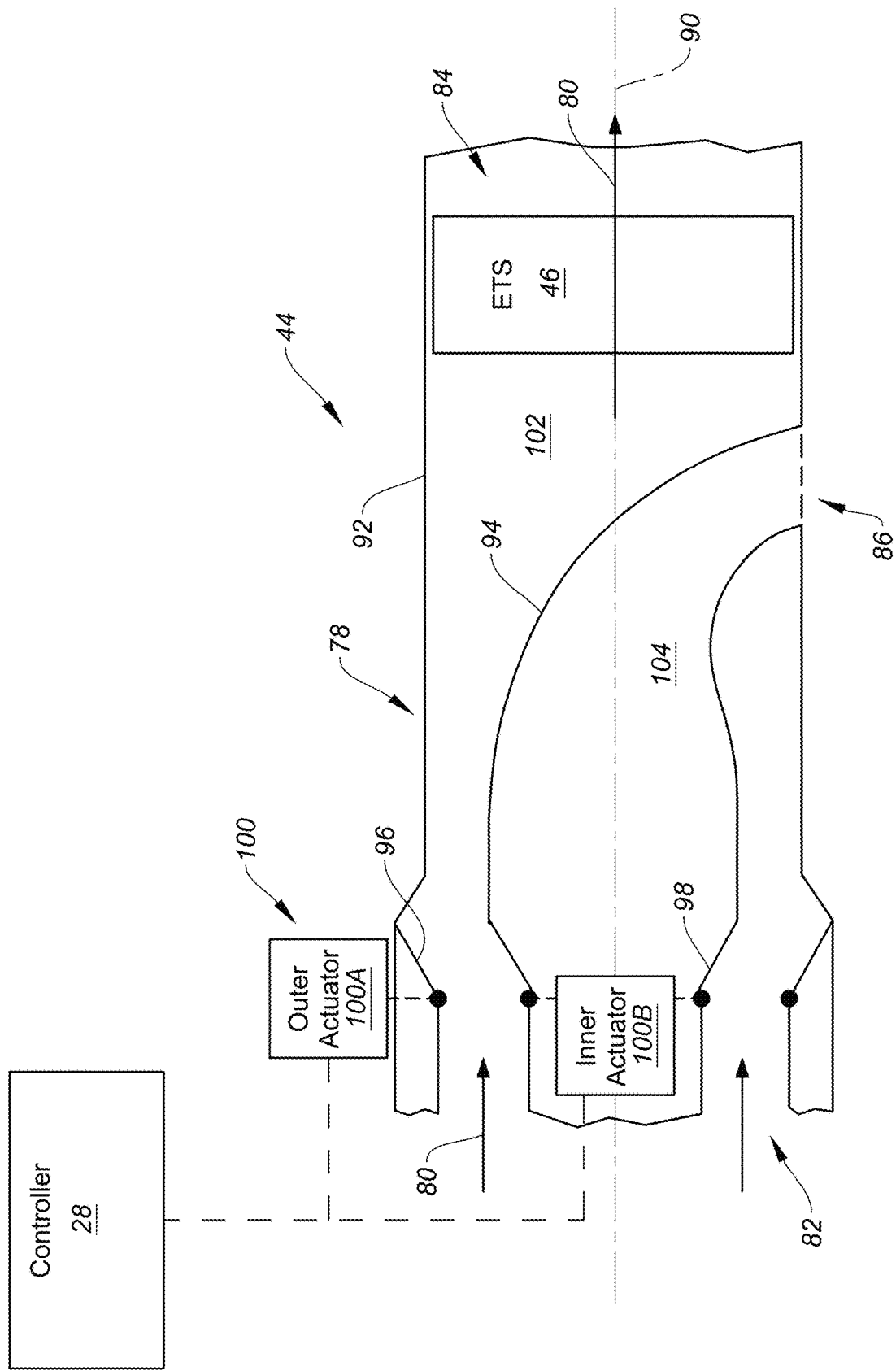

FIGS. 4A-B schematically illustrate an embodiment of the exhaust nozzle assembly 44, the exhaust treatment system 46, and the nozzle bypass system 78. The nozzle bypass system 78 is shown in FIG. 4A in the bypass mode and the nozzle bypass system 78 is shown in FIG. 4B in the exhaust treatment mode. The exhaust nozzle assembly 44 of FIGS. 4A-B extends along an axis 90 (e.g., a centerline axis of the exhaust nozzle assembly 44). The axis 90 may or may not be co-axial with the rotational axis 52 (see FIG. 2). The inlet 82 of the nozzle bypass system 78 of FIGS. 4A-B is an annular inlet extending circumferentially about (e.g., completely around) the axis 90. For example, the inlet 82 may be formed between (e.g., radially between) an outer fixed structure and an inner fixed structure of the exhaust nozzle assembly 44. The nozzle bypass system 78 of FIGS. 4A-B includes an outer nozzle body 92, an inner nozzle body 94, an outer plurality of overlapping petals 96, an inner plurality of overlapping petals 98, and an actuation system 100. The outer nozzle body 92 extends circumferentially about (e.g., completely around) the axis 90. The outer nozzle body 92 forms an outer nozzle duct 102 extending between and to the inlet 82 and the first outlet 84. The outer nozzle body 92 circumscribes the inner nozzle body 94 forming the outer nozzle duct 102 therebetween. The inner nozzle body 94 forms an inner nozzle duct 104 extending between and to the inlet 82 and the second outlet 86. The inner nozzle body 94 extends through the outer nozzle body 92 or otherwise forms the second outlet 86 at (e.g., on, adjacent, or proximate) the outer nozzle body 92 on an axially-intermediate portion of the outer nozzle body 92 axially between the inlet 82 and the exhaust treatment system 46. The exhaust treatment system 46 is disposed within or downstream of the outer nozzle duct 102 (e.g., relative to core combustion gas 80 flow through the outer nozzle duct 102). For example, the exhaust treatment system 46 of FIGS. 4A-B is disposed within the outer nozzle duct 102 and spans all or substantially all of a cross-sectional area (e.g., on a plane orthogonal to the axis 90) of the outer nozzle duct 102.

The outer overlapping petals 96 and the inner overlapping petals 98 are pivotably mounted within the exhaust nozzle assembly 44 (e.g., pivotably mounted to the outer fixed structure and the inner fixed structure) and further form a portion of the inlet 82. The outer overlapping petals 96 and the inner overlapping petals 98 are arranged circumferentially about (e.g., completely around) the axis 90. The actuation system 100 is configured to pivot the outer overlapping petals 96 and the inner overlapping petals 98 to control respective positions of the outer overlapping petals 96 and the inner overlapping petals 98. The actuation system 100 of FIGS. 4A-B includes an outer actuator 100A and an inner actuator 100B. The actuation system 100 (e.g., the outer actuator 100A and the inner actuator 100B) may be connected in signal communication with the controller 28. The outer actuator 100A is operably connected to the outer overlapping petals 96. The inner actuator 100B is operably connected to the inner overlapping petals 98. The outer actuator 100A and the inner actuator 100B may include hydraulic actuators, electro-mechanical actuators, electric motors, linear actuators, or the like, and the present disclosure is not limited to any particular configuration of the actuation system 100 or its actuators 100A, 100B for effecting movement (e.g., pivoting) of the outer overlapping petals 96 and the inner overlapping petals 98.

In operation, the outer actuator 100A and the inner actuator 100B control the outer overlapping petals 96 and the inner overlapping petals 98, respectively, to pivot between and to an inner radial position and an outer radial position. As shown in FIG. 4A, the outer overlapping petals 96 and the inner overlapping petals 98 in their respective inner radial positions direct the core combustion gas 80 from the inlet 82, into and through the inner nozzle duct 104, and through the second outlet 86. The outer overlapping petals 96, in the inner radial position, obstruct all or substantially all of the core combustion gas 80 from entering the outer nozzle duct 102. As shown in FIG. 4B, the outer overlapping petals 96 and the inner overlapping petals 98 in their respective outer radial positions direct the core combustion gas 80 from the inlet 82, into and through the outer nozzle duct 102, and through the exhaust treatment system 46 to the first outlet 84. The inner overlapping petals 98, in the outer radial position, obstruct all or substantially all of the core combustion gas 80 from entering the inner nozzle duct 104.

Figure 5B:
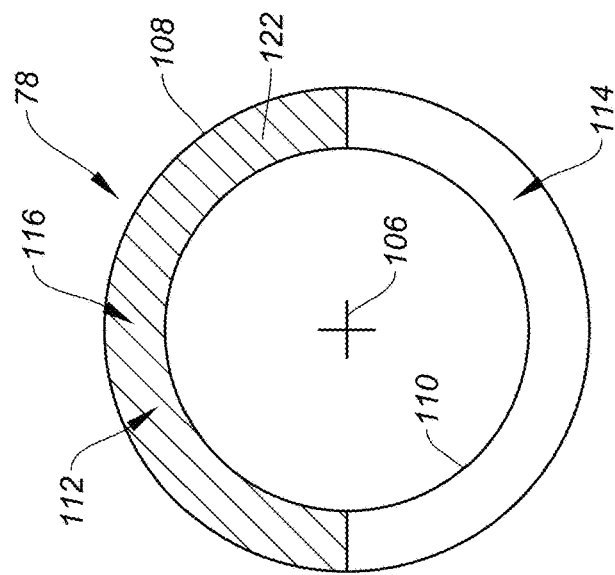
FIGS. 5A-D schematically illustrate views of another nozzle bypass system in a bypass mode and an exhaust treatment mode, in accordance with one or more embodiments of the present disclosure.
Figure 5A:
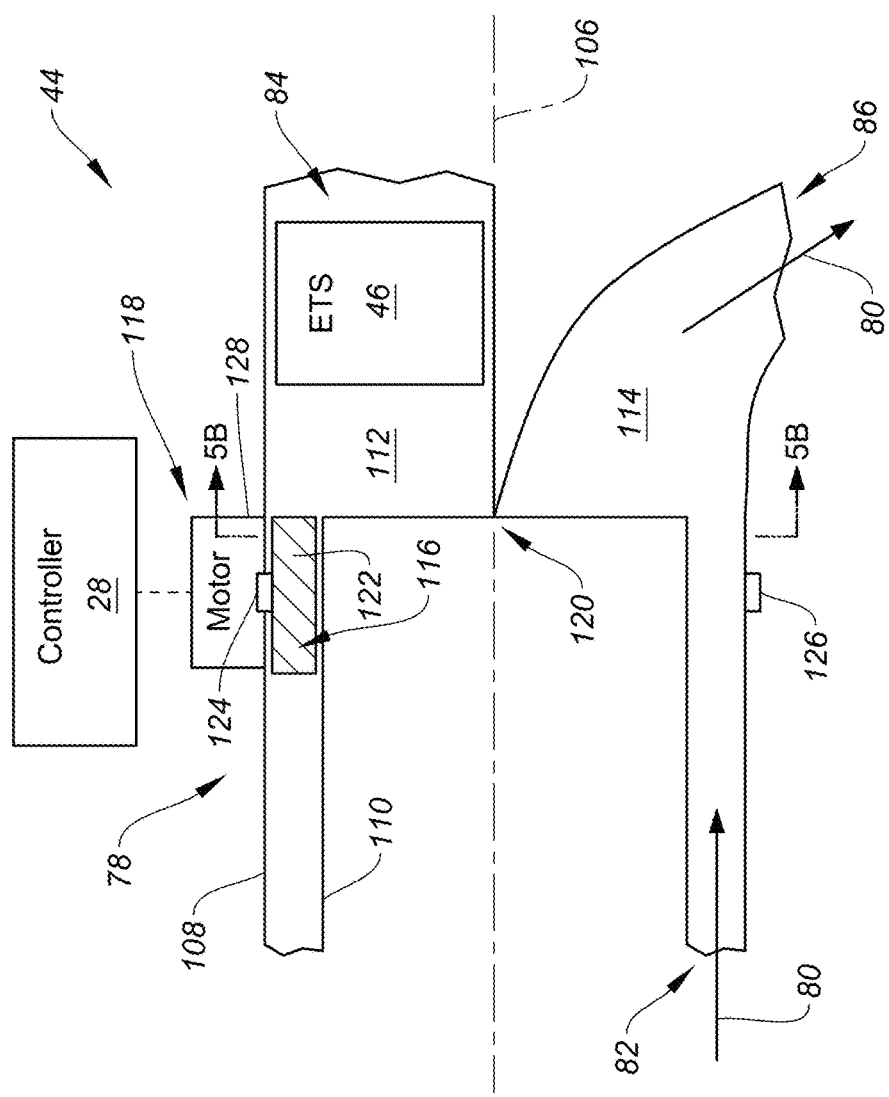
Figure 5D:
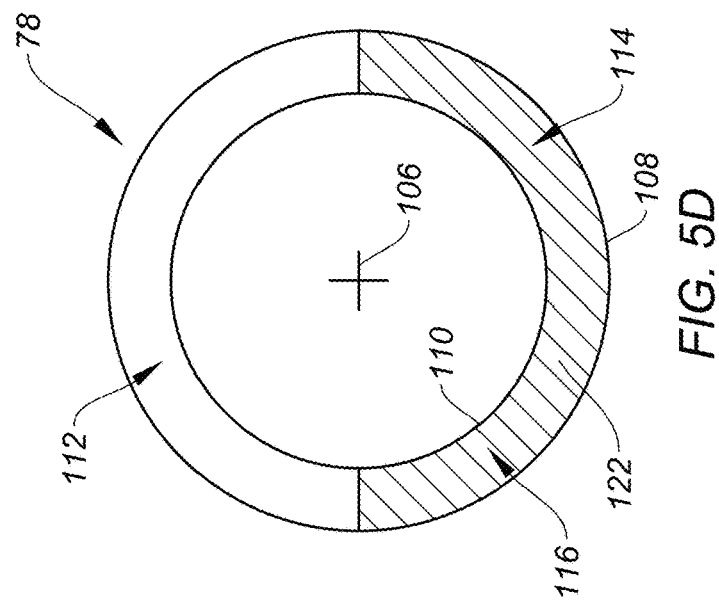
Figure 5C:
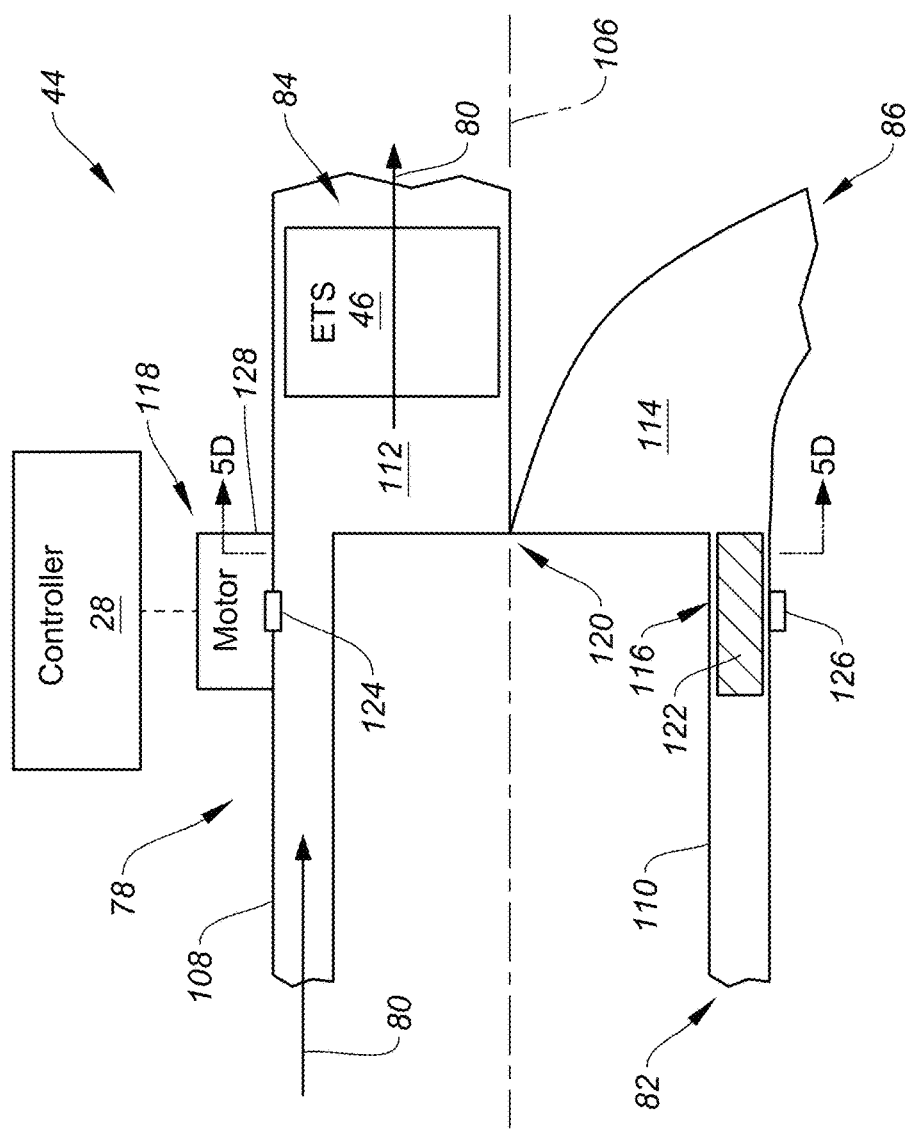

FIGS. 5A-D schematically illustrate another embodiment of the exhaust nozzle assembly 44, the exhaust treatment system 46, and the nozzle bypass system 78. The nozzle bypass system 78 is shown in FIGS. 5A-B in the bypass mode and the nozzle bypass system 78 is shown in FIGS. 5C-D in the exhaust treatment mode. FIG. 5B illustrates a cross-sectional view of the nozzle bypass system 78 taken along Line 5B-5B of FIG. 5A. FIG. 5D illustrates a cross-sectional view of the nozzle bypass system 78 taken along Line 5D-5D of FIG. 5C. The exhaust nozzle assembly 44 of FIGS. 5A-B extends along an axis 106 (e.g., a centerline axis of the exhaust nozzle assembly 44). The axis 106 may or may not be co-axial with the rotational axis 52 (see FIG. 2). The inlet 82 of the nozzle bypass system 78 of FIGS. 5A-D is an annular inlet extending circumferentially about (e.g., completely around) the axis 106. For example, the inlet 82 of FIGS. 5A-D is formed between (e.g., radially between) an outer nozzle body 108 and an inner nozzle body 110 of the exhaust nozzle assembly 44. The outer nozzle body 108 and the inner nozzle body 110 extend circumferentially about (e.g., complete around) the axis 106.

The nozzle bypass system 78 of FIGS. 5A-D includes an exhaust treatment duct 112, a bypass duct 114, a blocking member 116, and an actuation system 118. The exhaust treatment duct 112 and the bypass duct 114 form a bifurcated interface 120 with the inlet 82. The exhaust treatment duct 112 is connected in fluid communication with the inlet 82 along a first arcuate (e.g., semicircular relative to the axis 106) portion of the inlet 82 at (e.g., on, adjacent, or proximate) the bifurcated interface 120. The exhaust treatment duct 112 extends between and to the inlet 82 and the first outlet 84. The exhaust treatment system 46 is disposed within or downstream of the exhaust treatment duct 112 (e.g., relative to core combustion gas 80 flow through the exhaust treatment duct 112). For example, the exhaust treatment system 46 of FIGS. 5A-D is disposed within the exhaust treatment duct 112 and spans all or substantially all of a cross-sectional area of the exhaust treatment duct 112. The bypass duct 114 is connected in fluid communication with the inlet 82 along a second arcuate (e.g., semicircular relative to the axis 106) portion of the inlet 82 at (e.g., on, adjacent, or proximate) the bifurcated interface 120.

The blocking member 116 includes an arcuate blocking body 122. The blocking member 116 may additionally include an actuation ring 124. The arcuate blocking body 122 is disposed at (e.g., on, adjacent, or proximate) the bifurcated interface 120 within the inlet 82. The arcuate blocking body 122 extends partially-circumferentially about the axis 106. The arcuate blocking body 122 is moveable about the axis 106 relative to the inlet 82. The arcuate blocking body 122 is operably connected to the actuation system 118. For example, the arcuate blocking body 122 may be mounted on a circumferential portion of the actuation ring 124. The actuation ring 124 may extend circumferentially about (e.g., completely around) the axis 106. The actuation ring 124 may be moveable coupled, for example, to the outer nozzle body 108 facilitate rotation of the actuation ring 124 and the arcuate blocking body 122 about the axis 106. The actuation ring 124 may include a geared outer surface 126 (e.g., outer radial surface) disposed at (e.g., on, adjacent, or proximate) an exterior of the outer nozzle body 108. The actuation ring 124 may be engaged with and form a portion of the actuation system 118. For example, the actuation system 118 of FIGS. 5A-D includes a motor 128 (e.g., an electric motor) engaged with the actuation ring 124 (e.g., the geared outer surface 126) to drive rotation of the actuation ring 124 and the arcuate blocking body 122 about the axis 106. The actuation system 118 (e.g., the motor 128) may be connected in signal communication with the controller 28.

In operation, the actuation system 118 controls a circumferential position of the arcuate blocking body 122 at (e.g., on, adjacent, or proximate) the bifurcated interface 120. For example, the motor 128 may drive rotation of the actuation ring 124 about the axis 106 to position the arcuate blocking body 122 in one of a bypass circumferential position or an exhaust treatment circumferential position. In the bypass circumferential position (see FIGS. 5A-B), the arcuate blocking body 122 obstructs all or substantially all of the core combustion gas 80 from entering the exhaust treatment duct 112, and thereby directing all or substantially all of the core combustion gas 80 into and through the bypass duct 114 to the second outlet 86. In the exhaust treatment circumferential position (see FIGS. 5C-D), the arcuate blocking body 122 obstructs all or substantially all of the core combustion gas 80 from entering the bypass duct 114, and thereby directing all or substantially all of the core combustion gas 80 into and through the exhaust treatment duct 112 and the exhaust treatment system 46 to the first outlet 84.

Figure 6A:
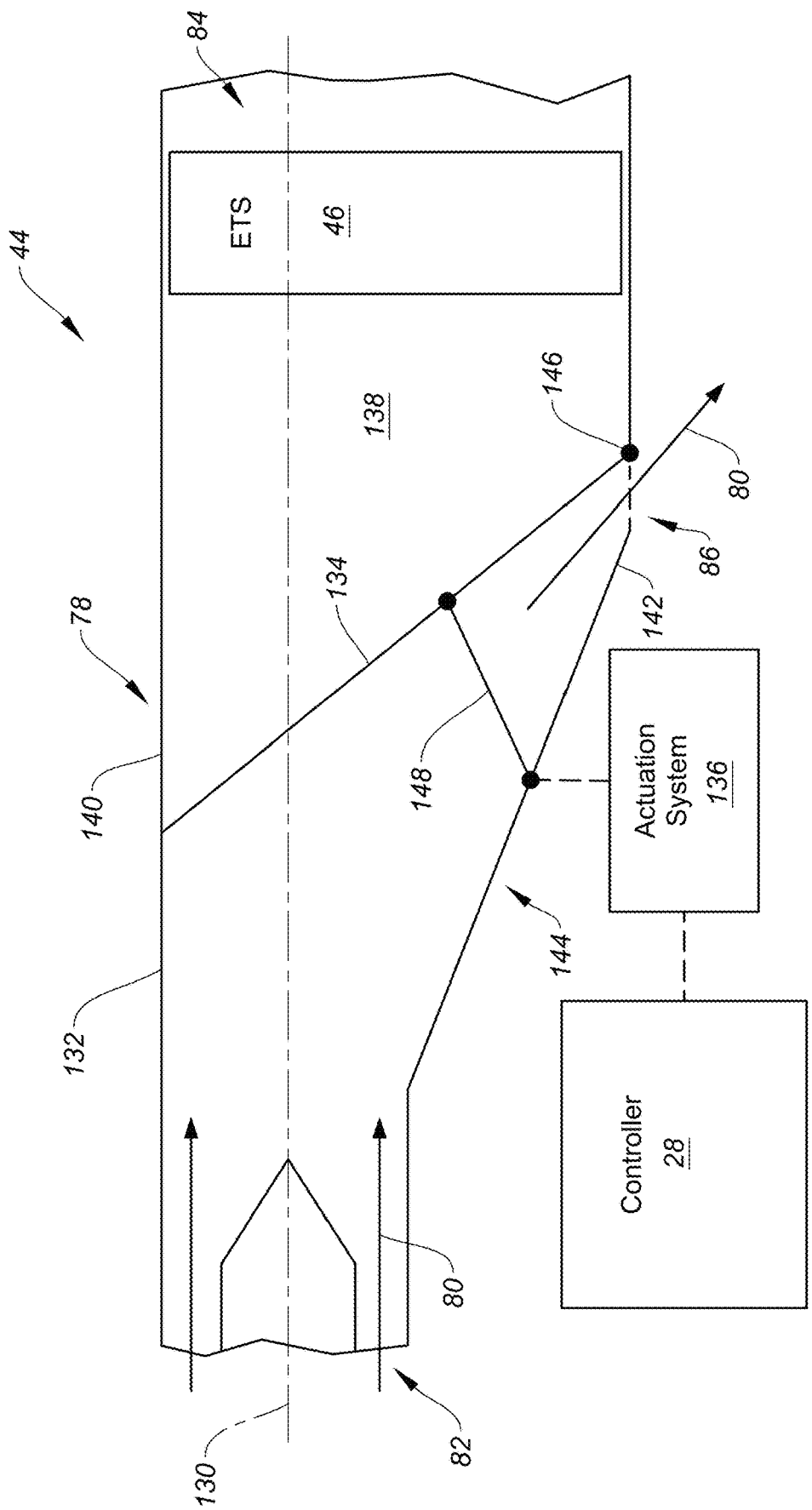
FIGS. 6A-B schematically illustrate cutaway, side views of another nozzle bypass system in a bypass mode and an exhaust treatment mode, in accordance with one or more embodiments of the present disclosure.
Figure 6B:
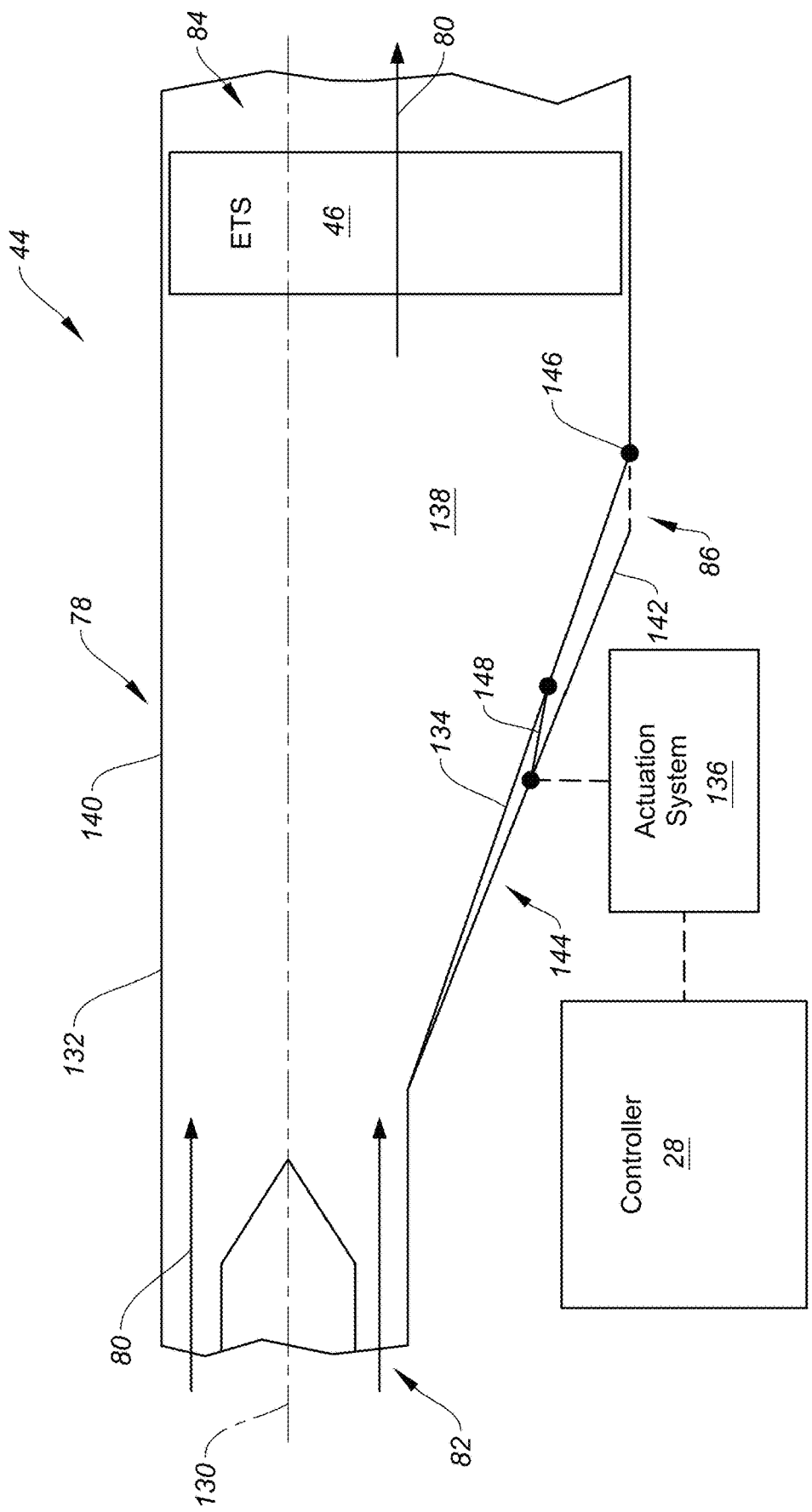

FIGS. 6A-B schematically illustrate another embodiment of the exhaust nozzle assembly 44, the exhaust treatment system 46, and the nozzle bypass system 78. The nozzle bypass system 78 is shown in FIG. 6A in the bypass mode and the nozzle bypass system 78 is shown in FIG. 6B in the exhaust treatment mode. The exhaust nozzle assembly 44 of FIGS. 6A-B extends along an axis 130. The axis 130 may or may not be co-axial with the rotational axis 52 (see FIG. 2). The nozzle bypass system 78 of FIGS. 6A-B includes an outer nozzle body 132, a duct panel 134, and an actuation system 136. The outer nozzle body 132 of FIGS. 6A-B surrounds and forms a nozzle duct 138 extending along the axis 130 from the inlet 82 to the first outlet 84. For example, the outer nozzle body 132 may form the nozzle duct 138 with a square or rectangular cross-sectional shape (e.g., orthogonal to the axis 130). The present disclosure, however, is not limited to any particular shape of the nozzle duct 138. The outer nozzle body 132 includes a first side 140 of the outer nozzle body 132 and an opposing second side 142 of the outer nozzle body 132. The first side 140 may be disposed opposite the second side 142 relative to the axis 130. The first side 140 and the second side 142 form the nozzle duct 138. The outer nozzle body 132 may form a diffusing portion of the nozzle duct 138. As shown in FIGS. 6A-B, for example, the second side 142 may diverge outward in an upstream-to-downstream direction to form a diffusion zone 144 of the nozzle duct 138. The outer nozzle body 132 further forms the second outlet 86 extending through the outer nozzle body 132 (e.g., from an interior of the outer nozzle body 132 to an exterior of the outer nozzle body 132). For example, the second outlet 86 may be formed through the second side 142 axially between the diffusion zone 144 and the duct panel 134.

The duct panel 134 is pivotably mounted to the outer nozzle body 132. For example, the duct panel 134 of FIGS. 6A-B is pivotably mounted to the second side 142 downstream of the second outlet 86 about a pivot axis 146. The duct panel 134 is pivotable about the pivot axis 146 between a deployed position (see FIG. 6A) and a retracted position (see FIG. 6B). The actuation system 136 includes an actuator 148 (e.g., a linear actuator) pivotably connected to the duct panel 134. The actuator 148 may additionally be pivotably connected to the outer nozzle body 132 (e.g., the second side 142). The actuation system 136 is configured to control the actuator 148 to position (e.g., pivot) the duct panel 134 in the deployed position or the retracted position. The actuation system 136 and its actuator may be configured using a hydraulic actuator, and electro-mechanical actuator, or the like, and the present disclosure is not limited to any particular configuration of the actuation system 136 or its actuator 148. The actuation system 136 may be connected in signal communication with the controller 28.

In operation, the actuation system 136 (e.g., the actuator 148) controls a position of the duct panel 134 in the deployed position or the retracted position. In the deployed position, the duct panel 134 may extend outward from the second side 142 toward the first side 140 such that the duct panel 134 is disposed at (e.g., on, adjacent, or proximate) the first side 140. In this deployed position, the duct panel 134 may obstruct all or substantially all of the core combustion gas 80 from the inlet 82 to the first outlet 84 through the nozzle duct 138. In the retracted position, the duct panel 134 may be disposed at (e.g., on, adjacent, or proximate) and extend along the second side 142, for example, within the diffusion zone 144. In this retracted position, the duct panel 134 may obstruct all or substantially all of the core combustion gas 80 from the inlet 82 to the second outlet 86.

FIGS. 7A-B schematically illustrate an embodiment of the exhaust nozzle assembly 44, the exhaust treatment system 46, and the nozzle bypass system 78. The nozzle bypass system 78 is shown in FIG. 7A in the bypass mode and the nozzle bypass system 78 is shown in FIG. 7B in the exhaust treatment mode. The exhaust nozzle assembly 44 of FIGS. 7A-B extends along an axis 150. The axis 150 may or may not be co-axial with the rotational axis 52 (see FIG. 2). The nozzle bypass system 78 of FIGS. 7A-B includes an outer nozzle body 152 and an actuation system 154. The outer nozzle body 152 extends about (e.g., completely around) the axis 150. The outer nozzle body 152 forms a nozzle duct 156 extending along the axis 150 between and to the inlet 82 and the first outlet 84. For example, the outer nozzle body 152 may form the nozzle duct 156 with a square, rectangular, or circular cross-sectional shape (e.g., orthogonal to the axis 150). The present disclosure, however, is not limited to any particular shape of the nozzle duct 156. The nozzle duct 156 of FIGS. 7A-B is a diverging-converging nozzle duct, however, the present disclosure is not limited to this particular configuration of the nozzle duct 156. In contrast to the nozzle bypass system 78 embodiments of FIGS. 3-6, the nozzle bypass system 78 of FIGS. 7A-B does not include a second outlet 86 (e.g., to bypass the exhaust treatment system 46). The outer nozzle body 152 of FIGS. 7A-B forms a treatment system cavity 158 connected to and outside of (e.g., radially outside of) the nozzle duct 156. The exhaust treatment system 46 of FIGS. 7A-B (e.g., a heat exchanger, a monolithic catalyst, etc.) is pivotably mounted to the outer nozzle body 152 at (e.g., on, adjacent, or proximate) the treatment system cavity 158 about a pivot axis 160. The exhaust treatment system 46 is pivotable about the pivot axis 160 between a deployed position (see FIG. 7A) and a retracted position (see FIG. 7B). Any fluid interconnections of the exhaust treatment system 46 (e.g., a heat exchanger), for example, may be accomplished using a suitable flexible fluid conduit (e.g., a hose, a tube, etc.). The actuation system 154 may include hydraulic actuators, electro-mechanical actuators, electric motors, linear actuators, or the like, and the present disclosure is not limited to any particular configuration of the actuation system 154 for effecting movement (e.g., pivoting) of the exhaust treatment system 46. The actuation system 154 may be connected in signal communication with the controller 28.

In operation, the actuation system 154 controls a position of the exhaust treatment system 46 in the deployed position or the retracted position. In the deployed position, the exhaust treatment system 46 is disposed within the nozzle duct 156 such that all or substantially all of the core combustion gas 80 flow from the inlet 82 to the first outlet 84 is directed through the exhaust treatment system 46. In the retracted position, the exhaust treatment system 46 is disposed within the treatment system cavity 158 (e.g., outside of the nozzle duct 156). In this retracted position, the core combustion gas 80 flows directly from the inlet 82 to the first outlet 84 without passing through the exhaust treatment system 46.

Referring to FIGS. 2-7, operation of the nozzle bypass system 78 to configure the nozzle bypass system 78 the exhaust treatment mode or the bypass mode may be manually controlled, for example, by a pilot or other operator of the aircraft 20 (see FIG. 1). Additionally or alternatively, the controller 28 may control the nozzle bypass system 78 (e.g., the actuation systems 100, 118, 136, 154) to configure the nozzle bypass system 78 in the exhaust treatment mode or the bypass mode. For example, the memory 76 may include instructions which, when executed by the processor 74, cause the processor 74 to control the nozzle bypass system 78 (e.g., the actuation systems 100, 118, 136, 154) to configure the nozzle bypass system 78 the exhaust treatment mode or the bypass mode.

The controller 28 may identify a flight condition of the aircraft 20 or its propulsion system 22 and control a mode of the nozzle bypass system 78 based on the identified flight condition. In a first subset of identified flight conditions (e.g., a takeoff condition, an engine failure condition, a high-acceleration condition, etc.), the controller 28 may control the nozzle bypass system 78 in the bypass mode to facilitate improved performance (e.g., power output) of the gas turbine engine 24. In a second subset of identified flight conditions (e.g., a cruise condition, a landing condition, a taxiing or other grounded condition, etc.), the controller 28 may control the nozzle bypass system 78 in the exhaust treatment mode to facilitate reduced exhaust emissions of harmful gas or other substances.

The controller 28 may measure one or more operational parameters of the propulsion system 22 or its gas turbine engine 24 (e.g., using one or more sensors) and control a mode of the nozzle bypass system 78 based on the one or more measured operational parameters. For example, the controller 28 may measure and identify an operational parameter of the gas turbine engine 24 outside of (e.g., greater than) a threshold value for that operational parameter, and control the nozzle bypass system 78 to shift from the exhaust treatment mode to the bypass mode. Examples of the operational parameter may include, but are not limited to, a power (e.g., a shaft horsepower), a shaft rotational speed, and/or a shaft torque of the gas turbine engine 24 (e.g., the first rotational assembly 48 and/or the second rotational assembly 50), a gas turbine engine exhaust temperature, a turbine inlet temperature, an air speed of the aircraft 20, and an ambient air temperature for the aircraft 20 (see FIG. 1).

For multi-fuel gas turbine engine 24 configurations, the controller 28 may control and/or identify a fuel selection for the gas turbine engine 24 (e.g., a hydrocarbon fuel, a hydrogen fuel, etc.). The controller 28 may control a mode of the nozzle bypass system 78 based on the controlled or identified fuel selection. For example, in response to or in coordination with the selection of a hydrocarbon fuel for combustion in the combustor 42, the controller 28 may control the nozzle bypass system 78 in the bypass mode to facilitate improved efficiency and performance of the gas turbine engine 24. In response to or in coordination with the selection of a hydrogen fuel for combustion in the combustor 42, the controller 28 may control the nozzle bypass system 78 in the exhaust treatment mode to facilitate thermal conditioning (e.g., heating) of the hydrogen fuel by the exhaust treatment system 46 (e.g., a heat exchanger) prior to injection into the combustor 42.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

The terms "substantially," "about," "approximately," and other similar terms of approximation used throughout this patent application are intended to encompass variations or ranges that are reasonable and customary in the relevant field. These terms should be construed as allowing for variations that do not alter the basic essence or functionality of the invention. Such variations may include, but are not limited to, variations due to manufacturing tolerances, materials used, or inherent characteristics of the elements described in the claims, and should be understood as falling within the scope of the claims unless explicitly stated otherwise.

No element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. An aircraft propulsion system comprising:
a gas turbine engine including a compressor section, a combustor section, a turbine section, and an exhaust section, the compressor section, the combustor section, the turbine section, and the exhaust section form a core flow path through the gas turbine engine; and
an exhaust nozzle assembly disposed at the exhaust section, the exhaust nozzle assembly extending along an axis, the exhaust nozzle assembly includes a nozzle bypass system and an exhaust treatment system, the nozzle bypass system is selectively configurable in a bypass mode or an exhaust treatment mode, the nozzle bypass system in the bypass mode directs a core combustion gas from the core flow path through the exhaust nozzle assembly bypassing the exhaust treatment system, and the nozzle bypass system in the exhaust treatment mode directs the core combustion gas through the exhaust nozzle assembly and exhaust treatment system;

wherein the nozzle bypass system includes an inlet, a first outlet, and a second outlet, the nozzle bypass system in the bypass mode directs the core combustion gas from the inlet through the second outlet bypassing the exhaust treatment system, and the nozzle bypass system in the exhaust treatment mode directs the core combustion gas from the inlet through the first outlet and the exhaust treatment system; and wherein the exhaust treatment system is disposed within the exhaust nozzle assembly axially between the inlet and the first outlet.

2. The aircraft propulsion system of claim 1, wherein the nozzle bypass system further includes at least one actuator positionable in a first actuator position or a second actuator position, the at least one actuator is positioned in the first actuator position to configure the nozzle bypass system in the bypass mode, and the at least one actuator is positioned in the second actuator position to configure the nozzle bypass system in the exhaust treatment mode.

3. The aircraft propulsion system of claim 2, further comprising a controller including a processor connected in signal communication with memory including instructions which, when executed by the processor, cause the processor to control the nozzle bypass system in the bypass mode or the exhaust treatment mode by controlling the at least one actuator in the first actuator position or the second actuator position, respectively.

4. The aircraft propulsion system of claim 3, wherein the instructions, when executed by the processor, further cause the processor to:

identify a flight condition of the aircraft propulsion system; and control the nozzle bypass system in the bypass mode or the exhaust treatment mode in response to the identification of the flight condition by:

controlling the nozzle bypass system in the bypass mode for one of a first subset of flight conditions; and controlling the nozzle bypass system in the exhaust treatment mode for one of a second subset of flight conditions different than the first subset of flight conditions.

5. The aircraft propulsion system of claim 3, wherein the instructions, when executed by the processor, further cause the processor to:

measure an operational parameter of the aircraft propulsion system;

identify the operational parameter exceeds a threshold value; and control the nozzle bypass system from the exhaust treatment mode to the bypass mode in response to the identification of the operational parameter exceeding the threshold value.

6. The aircraft propulsion system of claim 3, wherein the instructions, when executed by the processor, further cause the processor to:

identify a selected fuel for the combustion section from one of a first fuel and a second fuel; and control the nozzle bypass system in the bypass mode or the exhaust treatment mode in response to the identification of the selected fuel by:

controlling the nozzle bypass system in the bypass mode where the selected fuel is identified as the first fuel; and controlling the nozzle bypass system in the exhaust treatment mode where the selected fuel is identified as the second fuel.

7. The aircraft propulsion system of claim 6, wherein the first fuel is a hydrocarbon fuel and the second fuel is a hydrogen fuel.

8. The aircraft propulsion system of claim 1, wherein the nozzle bypass system includes an outer nozzle body, an inner nozzle body, an outer plurality of overlapping petals, and an inner plurality of overlapping petals, the outer nozzle body forms an outer nozzle duct extending between and to the inlet and the first outlet, the inner nozzle body is disposed within the outer nozzle body, the inner nozzle body forms an inner nozzle duct extending between and to the inlet and the second outlet, the inner nozzle duct extends through the outer nozzle body to the second outlet, the outer plurality of overlapping petals and the inner plurality of overlapping petals are disposed at the inlet, each of the outer plurality of overlapping petals and the inner plurality of overlapping petals are pivotable between and to an inner radial position for the bypass mode and an outer radial position for the exhaust treatment mode, in the inner radial position the outer plurality of overlapping petals and the inner plurality of overlapping petals direct the core combustion gas from the inlet through the second outlet, and in the outer radial position the outer plurality of overlapping petals and the inner plurality of overlapping petals direct the core combustion gas from the inlet through the first outlet and the exhaust treatment system.

9. The aircraft propulsion system of claim 1, wherein the nozzle bypass system includes an outer nozzle body, an inner nozzle body, a bypass duct, an exhaust treatment duct, and a blocking member, the outer nozzle body and the inner nozzle body extend circumferentially about an axis of the nozzle bypass system to form the inlet, the bypass duct and the exhaust treatment duct form a bifurcated interface with the inlet, the bypass duct is connected in fluid communication with the inlet at the bifurcated interface along a first arcuate portion of the inlet, the bypass duct extends between and to the inlet and the second outlet, the exhaust treatment duct is connected in fluid communication with the inlet at the bifurcated interface along a second arcuate portion of the inlet, the blocking member is disposed within the inlet at the bifurcated interface, the blocking member is circumferentially moveable within the inlet at the bifurcated interface between and to a bypass circumferential position for the bypass mode and an exhaust treatment circumferential position for the exhaust treatment mode, in the bypass circumferential position the blocking member directs the core combustion gas from the inlet through the second outlet, and in the exhaust treatment circumferential position the blocking member directs the core combustion gas from the inlet through the first outlet and the exhaust treatment system.

10. The aircraft propulsion system of claim 1, wherein the nozzle bypass system includes an outer nozzle body and a duct panel, the outer nozzle body extends along an axis of the nozzle bypass system, the outer nozzle body forms a nozzle duct extending from the inlet to the first outlet along the axis, the outer nozzle body includes a first side and an opposing second side, the outer nozzle body forms the second outlet through the second side, the duct panel is pivotably mounted to the second side downstream of the second outlet, the duct panel is pivotable between and to a deployed position for the bypass mode and a retracted position for the exhaust treatment mode, in the deployed position the duct panel is disposed at the first side and the duct panel directs the core combustion gas through the second outlet, and in the retracted position the duct panel is disposed along the second side and the duct panel directs the core combustion gas through the first outlet and the exhaust treatment system.

11. An aircraft propulsion system comprising:
a gas turbine engine including a compressor section, a combustor section, a turbine section, and an exhaust section, the compressor section, the combustor section, the turbine section, and the exhaust section form a core flow path through the gas turbine engine; and
an exhaust nozzle assembly disposed at the exhaust section, the exhaust nozzle assembly includes a nozzle bypass system and an exhaust treatment system, the nozzle bypass system includes at least one actuator positionable in a first actuator position or a second actuator position to selectively configure the nozzle bypass system in a bypass mode or an exhaust treatment mode, respectively,
the at least one actuator in the first actuator position controls the nozzle bypass system to direct a core combustion gas from the core flow path through the exhaust nozzle assembly bypassing the exhaust treatment system, and
the at least one actuator in the second actuator position controls the nozzle bypass system to direct the core combustion gas through the exhaust nozzle assembly and exhaust treatment system; and
a controller including a processor connected in signal communication with memory including instructions which, when executed by the processor, cause the processor to:
control the nozzle bypass system in the bypass mode or the exhaust treatment mode by controlling the at least one actuator in the first actuator position or the second actuator position, respectively; and
identify a selected fuel for the combustion section from one of a first fuel and a second fuel; and
control the nozzle bypass system in the bypass mode or the exhaust treatment mode in response to the identification of the selected fuel by:
controlling the nozzle bypass system in the bypass mode where the selected fuel is identified as the first fuel; and
controlling the nozzle bypass system in the exhaust treatment mode where the selected fuel is identified as the second fuel.

12. The aircraft propulsion system of claim 11, further comprising a nacelle forming an exterior housing for the gas turbine engine, the nacelle and the exhaust section form a bypass flow path through the aircraft propulsion system, and the at least one actuator in the first actuator position controls the nozzle bypass system to direct the core combustion gas from the core flow path into the bypass flow path bypassing the exhaust treatment system.

13. The aircraft propulsion system of claim 11, wherein the exhaust treatment system includes a monolithic catalyst structure.

14. The aircraft propulsion system of claim 11, wherein the exhaust treatment system includes a heat exchanger.

15. The aircraft propulsion system of claim 11, wherein the instructions, when executed by the processor, further cause the processor to:
identify a flight condition of the aircraft propulsion system; and
control the nozzle bypass system in the bypass mode or the exhaust treatment mode in response to the identification of the flight condition by:
controlling the nozzle bypass system in the bypass mode for one of a first subset of flight conditions; and
controlling the nozzle bypass system in the exhaust treatment mode for one of a second subset of flight conditions different than the first subset of flight conditions.

16. The aircraft propulsion system of claim 11, wherein the instructions, when executed by the processor, further cause the processor to:
measure an operational parameter of the aircraft propulsion system;
identify the operational parameter exceeds a threshold value; and
control the nozzle bypass system from the exhaust treatment mode to the bypass mode in response to the identification of the operational parameter exceeding the threshold value.

17. An aircraft propulsion system comprising:
a gas turbine engine including a compressor section, a combustor section, a turbine section, and an exhaust section, the compressor section, the combustor section, the turbine section, and the exhaust section form a core flow path through the gas turbine engine; and
an exhaust nozzle assembly disposed at the exhaust section, the exhaust nozzle assembly includes a nozzle bypass system and an exhaust treatment system, the nozzle bypass system includes at least one actuator positionable in a first actuator position or a second actuator position to selectively configure the nozzle bypass system in a bypass mode or an exhaust treatment mode, respectively,
the at least one actuator in the first actuator position controls the nozzle bypass system to direct a core combustion gas from the core flow path through the exhaust nozzle assembly bypassing the exhaust treatment system, and
the at least one actuator in the second actuator position controls the nozzle bypass system to direct the core combustion gas through the exhaust nozzle assembly and exhaust treatment system;
wherein the exhaust treatment system includes a monolithic catalyst structure.

* * * * *